March 4, 1947.    P. W. GAENSSLE    2,416,871
HAND BRAKE ARRANGEMENT
Filed Nov. 14, 1944
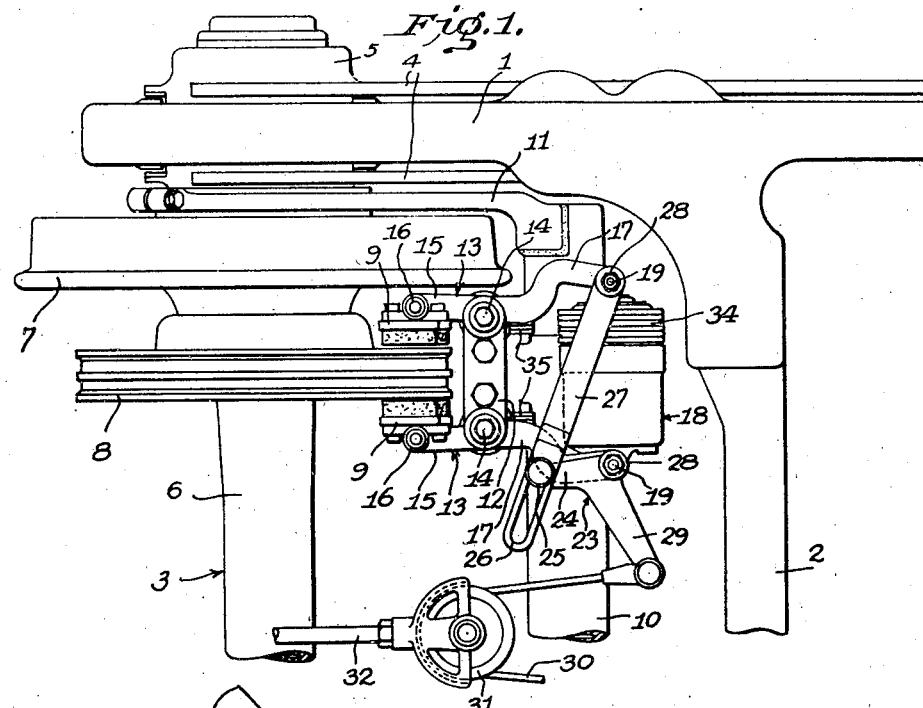
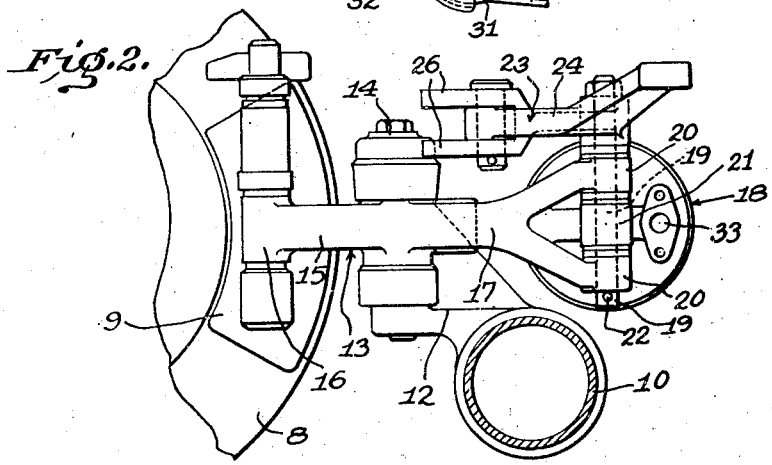
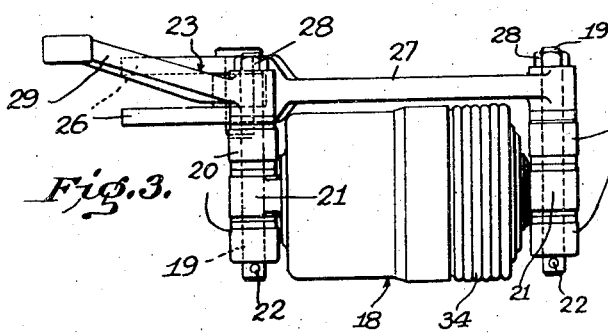
INVENTOR.
Paul W. Gaenssle
BY
ATTORNEY Patented Mar. 4, 1947

2,416,871

UNITED STATES PATENT OFFICE 2,416,871

HAND BRAKE ARRANGEMENT

Paul W. Gaenssle, Grosse Pointe Farms, Mich., assignor to The Budd Company, Philadelphia, Pa., a corporation of Pennsylvania Application November 14, 1944, Serial No. 563,339

3 Claims. (Cl. 188—107)

The invention relates to a brake mechanism and particularly to such a mechanism adapted for application to vehicles, such as railway trucks.

The invention is more particularly concerned with a brake mechanism of the radial disc type in which a rotary disc is arranged for cooperation with a pair of brake shoes engaging the opposite sides thereof and carried by a pair of brake levers pivotally mounted intermediate their ends on a brake support member extending transversely adjacent the periphery of the disc, the levers being actuated by a cylinder actuator to apply the brakes or by manual means.

The present invention is directed principally to the simplification and compact arrangement of the cylinder actuator, manual actuating means and brake levers. Ease of manufacture and assembly or disassembly constitutes a further aim of the invention.

These objects and advantages are attained by the construction described in detail in the following specification, and will be made clear when read in connection with the accompanying drawing in which:

Fig. 1 is a plan view of approximately one quarter section of a railway truck showing the invention applied thereto, it being understood that the other quarter at the same end of the truck may be similarly arranged;

Fig. 2 is a fragmentary vertical central section through the brake support showing the brake mechanism of Fig. 1 in elevation;

Fig. 3 is an end elevational view of the brake cylinder actuator and parts associated therewith.

In the drawings the invention has been shown in association with a railway truck comprising a frame having side members, as 1, interconnected by transoms, as 2. The truck frame is spring-supported in a usual manner from the wheel and axle assemblies, as 3, through equalizer bars, as 4, having their ends resting on the adjacent journal boxes, as 5, of the wheel and axle assembly.

The wheel and axle assembly comprises, as usual, an axle 6 journaled at its ends in the boxes 5 and carrying the spaced wheels, as 7. Each wheel has associated therewith for rotation therewith a brake disc 8 having annular braking faces on its opposite sides.

Associated with the braking faces are a pair of non-rotary braking elements, such as the segmental arcuate shoes 9, 9.

The support means for the shoes and their actuating means may comprise a transverse member 10 supported at its ends by longitudinal arms, as 11, from the adjacent journal boxes 5 and having a torque connection (not shown) to the truck frame.

On a bracket 12 rigidly secured to the transverse member 10 in the plane of a disc 9 are pivotally mounted the brake levers 13 which are constructed to make them interchangeable. The levers are pivoted intermediate their ends on the pivot pins indicated, at 14, 14, respectively, and have short arms, designated 15, 15 which are pivotally connected at 16, 16 to the respective shoes. The long arms 17, 17 carry between them the brake cylinder actuator, generally designated 18. Such actuator may comprise a relatively movable cylinder and piston, one of said cylinder and piston being connected to each of the arms 17, as by vertical pins 19. The arms 17 are bifurcated to provide spaced upper and lower bearings or bosses 20 between which is projected a similar bearing or boss, as 21, connected to the cylinder or piston of the actuator. The pins 19 extend through aligned holes in the bosses 20 and 21 and pivotally connect the ends of the lever arms 17 to the respective cylinder and piston of the actuator 18.

At their lower ends the pins 19 may be provided with transverse pins 22 such as cotter pins, to limit their upward movement, and at the top they may be provided with extensions above the top boss or bearing 20 on the associated lever arm 17.

These extensions provide convenient means for mounting the manual actuating means which comprises a bell crank lever 23, pivotally mounted on the top extension of one pin 19. One arm of this lever, as 24, has lost motion connection through the slot and pin connection 25 with the bifurcated end 26 of a link 27, the other end of which is pivotally connected through the top extension of the other pin 19. The pins 19 are prevented from downward movement by means, such as the nuts 28 screw threaded on the threaded upper ends of the pins.

The other and longer arm 29 of the bell crank 23 is extended in a generally inward direction toward the center line of the truck and is there connected to suitable equalizing means such as a cable 30 connecting it to a similar bell crank at the opposite side of the truck, which cable passes around a sheave 31 mounted on the end of a manually actuated longitudinally extending pull rod 32.

It will be noted that this arrangement of cylinder and manual actuating means with relation to the levers provides a very compact arrangement of parts and one which lends itself readily to easy manufacture and assembly.

As shown in Fig. 2, the closed end of the cylinder of actuator 18 is provided with an admission port 33 to which an air hose may be readily attached and the opposite end of the cylinder is provided with an extensible bellows 34 to prevent the entrance of dirt and water but permitting the relative movement of piston and cylinder when compressed air is admitted to apply the brakes. The lost motion connection in the manual actuating means prevents its operation, when the cylinder is actuated to force the ends of the lever arms 17, 17 apart to apply the brakes. A return spring (not shown) is provided in the cylinder actuator to return the parts to inoperative position with the levers abutting the stops 35 provided on the bracket 12.

While a specific embodiment of the invention has been herein described, it will be understood that changes and modifications may be made by those skilled in the art without departing from the main features of the invention, and such changes and modifications are intended to be covered by the appended claims.

What is claimed is:

1. In a brake arrangement for vehicles, a rotary brake disc, a pair of brake shoes for operative engagement with the opposite faces of said disc, and support means for said shoes comprising a transversely extending member disposed adjacent the periphery of said disc, brake levers pivoted on said member and having operative engagement with the respective shoes, and a brake cylinder actuator having relatively movable parts pivoted to the respective levers, and a manually actuated lever pivoted on the same pivot as one of said parts and having a link connection to the pivot between the other of said parts and its lever.

2. In a brake arrangement for vehicles, a rotary brake disc, a pair of brake shoes for operative engagement with the opposite faces of said disc, and support means for said shoes comprising a transversely extending member disposed adjacent the periphery of said disc, brake levers pivotally supported on said member intermediate their ends, the arms of the levers extending on one side of their pivotal supports operatively engaging the respective shoes, the other arms of said levers having bifurcated ends, a cylinder actuator having relatively movable parts, one extending between the furcations of each of the respective levers, and pivotally connected thereto, and manually operated lever actuating means mounted on said pivotal connections.

3. In a brake arrangement for vehicles, a rotary brake disc, a pair of brake shoes for operative engagement with said disc, and support means for said shoes comprising a transversely extending member disposed adjacent the periphery of the disc, brake levers pivoted intermediate their ends on said member, and having operative engagement through one of their ends with the respective shoes, a cylinder actuator having relatively movable parts, said parts being pivoted through vertical pins to the other ends of the respective levers, and a manual actuating means comprising a lever pivoted on an extended end of one of said pins, and connected through a link pivoted to an extended end of the other of said pins.

PAUL W. GAENSSLE.

REFERENCES CITED

The following references are of record in the file of this patent:

UNITED STATES PATENTS

| Number | Name | Date |
| --- | --- | --- |
| 2,352,223 | Trainer | June 27, 1944 |
| 2,236,898 | Eksergian | Apr. 1, 1941 |